March 8, 1949.  P. BUFFARDI  2,463,515
SAFETY DEVICE FOR MACHINERY
Filed Dec. 21, 1945  2 Sheets-Sheet 1
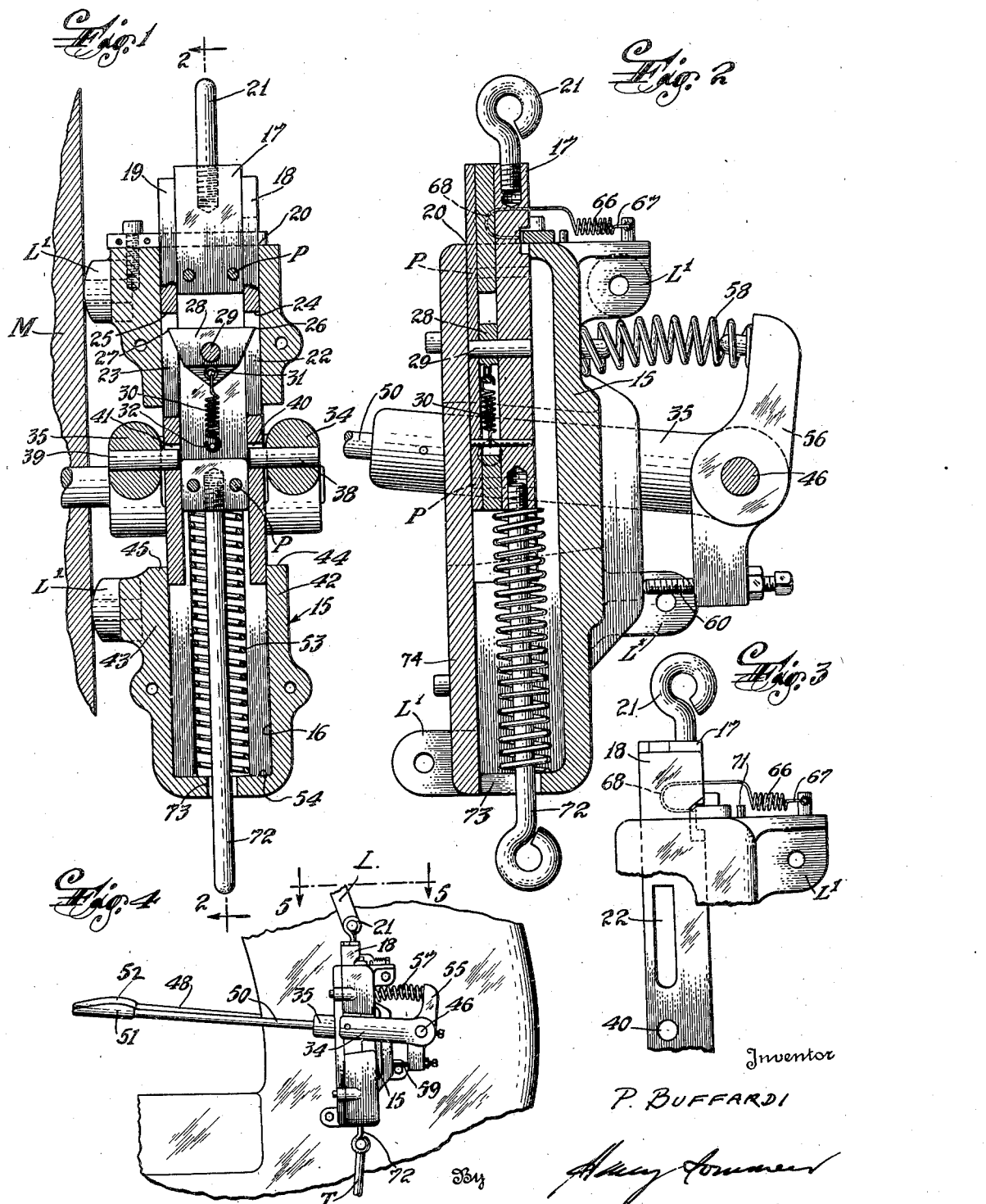
Inventor
P. BUFFARDI March 8, 1949. P. BUFFARDI 2,463,515
SAFETY DEVICE FOR MACHINERY
Filed Dec. 21, 1945 2 Sheets-Sheet 2
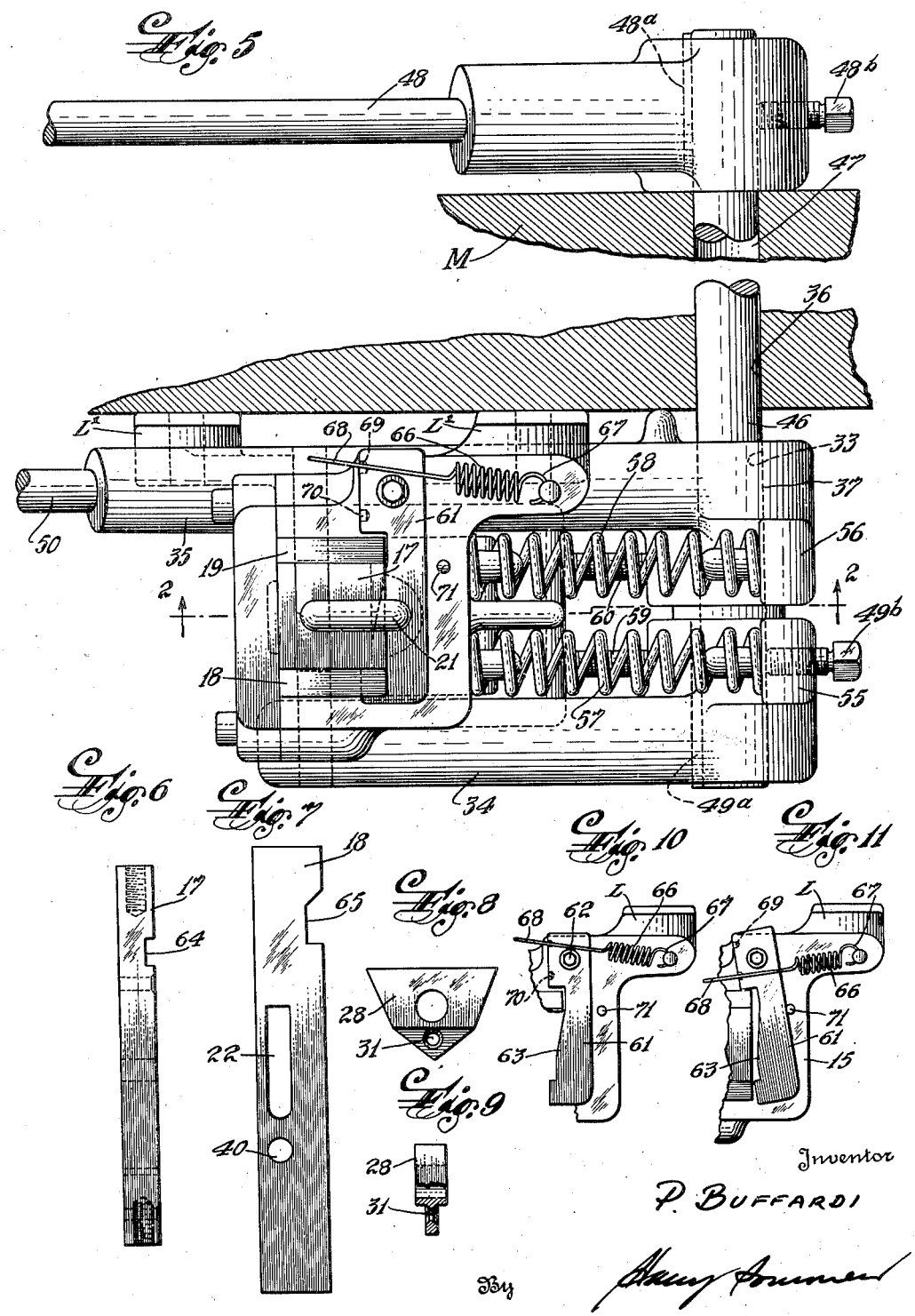

Patented Mar. 8, 1949

2,463,515

UNITED STATES PATENT OFFICE 2,463,515

SAFETY DEVICE FOR MACHINERY

Pasquale Buffardi, Irvington, N. J.

Application December 21, 1945, Serial No. 636,538

4 Claims. (Cl. 192—131)

This invention relates to improvements in safety devices for machinery. The invention is particularly applicable to machinery having parts which move in serial sequence to perform operations on work which may be hand fed into the machine or in connection with which an operator is customarily required.

In the use of such machinery, especially where work is manually handled or fed to the machine, there is great danger of injury to the hands of the operator. It has been proposed to provide machines with safety devices requiring the operator to hold the safety device with both hands. Such devices have heretofore been ineffective for the reason that operators have resorted to subterfuges, such as tying the safety device operating parts down, leaving the operator free to use his hands and sustain injuries to the same extent as though the machine was not equipped with a safety device.

It is the object of my invention to provide a safety device for machinery to control the throw-out clutch or other operating unit of the machine, the device being of such structure that it is necessary for the operator to simultaneously manually depress two handle members, using both hands, in order to operate the machine. If the operator tries to tie down one handle and to manually operate the other, it will be impossible to operate the machine by the use of the structure of my invention. It would likewise render the machine inoperative if both levers were tied down. I have provided a device which fills a long-felt want in the industry for a device which cannot be rendered ineffective by subterfuge.

These and other advantageous objects, which will later appear, are accomplished by the structure and arrangement of parts hereinafter described and shown in the accompanying drawings, in which:

Fig. 1 is a vertical sectional view of a safety device embodying my invention shown secured to a machine, the latter being shown fragmentarily, Fig. 2 is a vertical sectional view thereof taken on line 2—2 of Fig. 1 and line 2—2 of Fig. 5 in the direction of the arrows, Fig. 3 is a fragmentary side elevational view of the upper end of said device, Fig. 4 is a fragmentary side elevational view of the safety device on a reduced scale, shown applied to a machine with the handle ends of the operating levers shown at full length, Fig. 5 is a fragmentary top plan view taken on line 5—5 of Fig. 4, Fig. 6 is an edge elevational view of the rear portion of the operating slide member, Fig. 7 is an edge elevational view of one of the intermediate slide plates of the safety device of my invention, Fig. 8 is an elevational view of a control pawl used in my device, Fig. 9 is a partly sectional edge elevational view thereof, Fig. 10 is a fragmentary plan view of the device of my invention, showing the safety key plate in a position interlocking with the operating slide and with an intermediate slide to lock the parts against accidental movement, and Fig. 11 is a similar view showing the position of the pivoted safety key plate to clear the recessed portions of the slide plates.

As shown in the drawings, the safety device of my invention is housed in a casing 15 which is axially recessed at 16 to slidably receive the operating slide plate 17 and the intermediate slide plates 18 and 19, all of said plates being adapted to reciprocate in the casing and through the open upper end 20 thereof. The operating slide plate 17 is provided with fastener means 21, whereby the said plate may be secured to the unit of the machine to be controlled by the safety device of my invention. For example (see Fig. 4), in the application of the invention to a power press, the fastener 21 would be secured to the link L connected to the throw-out clutch mechanism. The intermediate slide plates 18, 19 are disposed intermediate the operating slide plate 17 and the operating levers 34 and 35 and serve to connect said parts only on the simultaneous use of both hands as hereinafter set forth. The intermediate slide plates 18 and 19 are provided with elongated slots 22 and 23, the upper edges 24 and 25 of which are adapted to be engaged by the ears 26 and 27 of the pawl 28, the latter being pivoted as at 29 on the operating slide 17. A tension spring 30 has one end thereof passed through an opening 31 in the pawl, the other end of said spring being fixed as at 32 to the operating slide to preclude free movement of the pawl and to normally dispose the ears 26 and 27 of the pawl 28 at a horizontal plane and within the slots 22, 23 of the intermediate slide plates.

At 36 and 37 the levers 34 and 35 are pivotally mounted on the frame of machine M or other bearing. Spaced from their pivoted ends, said levers have pins 38, 39 fixed thereto and freely received in openings 40 and 41 in the intermediate slide plates. Openings 40 and 41 are of larger diameter than the pins 38 and 39 (see Fig. 1). Although the intermediate slide plates reciprocate in a straight line or vertical plane which is intersected by the arc of a radius measured from the center of the pivot point of said levers to the center of the pins 38 and 39, the levers are moved for only a short distance so that the provision of openings 40 and 41 substantially larger than the diameter of said pins amply assures the smooth operation of the parts without wedging. The side walls 42 and 43 of the casing 15 are medially recessed at 44 and 45 to receive the levers 34 and 35 and permit of their limited pivotal movement.

The levers 34 and 35 may be pivoted in any conventional or desired manner as, for example, by providing the machine M with a transverse aperture or bore 47 to freely receive (and to serve as a journal for) the shaft 46. As will be noted from Fig. 5, a handle 48 is keyed at 48a, 48b to one end of the shaft 46 to enable the latter to be rotated by the handle and to thereby rotate in unison therewith lever 34 which is keyed to the other end of said shaft as at 49a, 49b. A similar handle 50 is fixed to the lever 35, the latter being provided with an opening 33 to freely receive the shaft 46 of the lever 34; said shaft 46 thus serves as the bearing on which the lever 35 is pivoted. Thus the levers 34 and 35 may be moved independently of each other or in unison by manipulating the handles 48 and 50 which are secured to said levers; said handles preferably terminate at 51, 52 (see Fig. 4) in flattened ends to facilitate manipulation thereof. As will be noted from Fig. 5, the handles 48 and 50 are disposed at opposite sides of the machine M. In order to move the unit of the machine controlled by the safety device of my invention, it is necessary to move the operating slide 17 downwardly against the tension of the spring 53 disposed in the casing 15 and bearing at opposite ends against the lower end of the operating slide and the lower end 54 of the casing 15. It will be noted that in the normal position of the parts shown in Fig. 1 the pawl 28 is disposed with the ears 26 and 27 thereof received within the slots 22 and 23 of the intermediate slides. From the foregoing, it will be seen that pawl 28 and the intermediate slide plates have complementary portions (22–27 inclusive) adapted to interlock the operating and intermediate slides when the device is properly operated.

It will be apparent from the foregoing description that the operating slide plate may be moved against the tension of spring 53 only by simultaneously depressing the intermediate slide plates 18 and 19, to thereby simultaneously engage the ear portions 26 and 27 of the pawl 28, to move the operating slide plate 17 downwardly in unison with the intermediate slide plates 18 and 19.

If the operator of the machine attempts to circumvent the use of the safety device described above by tying down one of the handles of the operating levers with a piece of wire or rope, the downward movement of the tied lever will cause the pawl 28 to rotate, to move the ears 26 and 27 of said pawl inwardly of the intermediate slides. It will then become impossible to operate the machine by simply depressing the handle of the other lever; such action will simply carry the other intermediate slide downwardly past the pawl without engaging the pawl. It will have no effect on the operating slide as the ears 26, 27 of the pawl will be positioned in a vertical plane, at the center line of the operating slide, instead of projecting outwardly beyond the side edges of said operating slide and into the slots 22, 23 of the intermediate slides.

The casing 15 may be mounted on the machine M by lugs L' or the like, receiving conventional mounting members to engage said lugs and said machine. The levers 34 and 35 are provided with arms 55 and 56 which may be formed integral therewith or may be separately secured thereto, said arms at one of their ends being adapted to receive springs 57 and 58 which bear against said arms and against the casing 15 to normally pivot the levers 34 and 35 and their associated parts upwardly in cooperation with the spring 53 in the casing 15. The other ends of said arms may be provided with stop mmebers 59, 60 to abut the casing and preclude excessive movement of said levers responsive to said springs.

The device may be provided (Figs. 5, 10 and 11) with a key plate 61 pivoted at one end 62 to the casing, said key plate being provided with a tongue portion 63 adapted to be received within the keyway 64 in the operating slide plate 17 and within a corresponding keyway 65 in the intermediate slide plate 18. The key plate 61 is urged to the position shown in Figs. 5 and 10, in which the tongue 63 thereof will move into said keyways, by a tension spring 66, one end 67 of which is fixed to the casing, the other free end 68 of said spring being preferably looped for facility of handling same (see Figs. 2 and 3), and adapted to be selectively positioned in either the recess 69 in the key 61 which is so disposed relative to the pivot 62 as to urge the tongue 63 into the keyways 64 and 65; or the spring may, alternately, be manually positioned in a second recess 70 disposed at the other side of the pivot 62 (as shown in Fig. 11) to thereby rotate the key plate 61 out of said keyways 64, 65. The casing 15 is provided with a pin 71 against which the key plate 61 may abut when the spring is positioned as shown in Fig. 11, to preclude excessive rotation of the key plate 61 responsive to spring 66.

It will be apparent from the foregoing description that, in addition to the safety device comprising the operating and intermediate slide plates and associated parts, the key plate 61 and associated parts provides a supplementary means operating in a plane at right angles to the longitudinal axis of said plates 17, 18, 19 to preclude accidental operation of the machine. It will be apparent from an examination of the drawings, particularly Figs. 2, 10 and 11, that the spring 66 provides a convenient means for manually engaging or disengaging the key plate 61.

If desired, the operating slide may be provided with a rod 72 fixed thereto, said rod passing through an opening 73 in the lower end of casing 15, and being secured to the link T of the treadle or other unit of the machine, so that, if desired, the operating slide plate 17 may be depressed by link T independently of the use of the operating levers 34 and 35. When the machine is so operated the operating slide plate 17 may reciprocate in the casing 15 without causing the handles 48 and 50 of the operating levers 34 and 35 to reciprocate in unison therewith. In devices heretofore proposed, the engagement of the treadle of the press caused the operating handles of the safety devices to move of their own volition, presenting a safety hazard. This objectional feature is overcome in the device of my invention.

The operating slide plate 17 may be formed as a unitary member or, as shown in Fig. 2, may consist of several parts secured together by pins P or the like, in any desired or convenient manner.

The front wall of the casing may be closed by plate 74 or the like, secured to the casing in any desired or convenient manner.

While I have shown the drawings and described in the above specification a convenient form of structure embodying my invention, it will be apparent from such disclosure that the invention, is capable of many modifications without departing from the spirit and scope thereof, as set forth in the appended claims.

Having thus described my invention what I claim as new and desire to secure by Letters Patent is:

1. A safety device for machines comprising a casing, an operating slide plate slidably arranged therein, intermediate slide plates in said casing slidably arranged therein to reciprocate adjacent said operating slide plate, a pawl rotatably secured to said operating plate, slots in said intermediate plates to receive and interlock with the pawl when the intermediate plates are moved in unison, and means engaging said intermediate slide plates for movement of the latter.

2. A safety device for machines comprising a casing, an operating slide plate slidably arranged therein, intermediate slide plates in said casing slidably arranged therein to reciprocate adjacent said operating slide plate, complementary means on said operating plate and slide plates to interlock said plates only when the slide plates are moved in unison, and means engaging said intermediate slide plates for the movement of the latter, and a key pivoted to said casing, said key having a tongue portion, said plates being provided with keyways to receive the tongue of said key to preclude accidental movement of said plates.

3. A safety device for machines comprising a casing, an operating slide plate slidably arranged therein, intermediate slide plates in said casing slidably arranged therein to reciprocate adjacent said operating slide plate, complementary means on said operating plate and slide plates to interlock said plates only when the slide plates are moved in unison, and means engaging said intermediate slide plates for the movement of the latter, and a key pivoted to said casing, said key having a tongue portion, said plates being provided with keyways to receive the tongue of said key to preclude accidental movement of said plates and spring means engaging said casing and adapted to be selectively engaged with said key at one of two positions to urge the tongue portion of the key into or out of disengagement with said keyways.

4. A safety device for machines comprising a casing, an operating slide plate slidably arranged therein, intermediate slide splates in said casing slidably arranged therein to reciprocate adjacent said operating slide plate, a pawl rotatably secured to said operating plate, said pawl having ears, slots in said intermediate plates to receive and interlock with the ears of said pawl when the intermediate plates are moved in unison, and spring means engaging said pawl and said operating slide plate to normally dispose the pawl in position for interlocking of the ears thereof with the slots of said intermediate plates.

PASQUALE BUFFARDI.

REFERENCES CITED

The following references are of record in the file of this patent:

UNITED STATES PATENTS

| Number | Name | Date |
| --- | --- | --- |
| 499,821 | Champney | June 20, 1893 |
| 1,391,190 | Kappes | Sept. 20, 1921 |
| 1,429,468 | Verdin | Sept. 19, 1922 |
| 2,301,817 | Rusch | Nov. 10, 1942 |